United States Patent [19]  [11] 3,904,684
Tsuda et al.  [45] Sept. 9, 1975

[54] METHOD FOR PRODUCING SODIUM CITRATE DIHYDRATE

[75] Inventors: Masahiko Tsuda; Yoshiaki Fujiwara; Tetsuya Shiraishi, all of Hyogo, Japan

[73] Assignee: Takeda Chemical Industries, Ltd., Osaka, Japan

[22] Filed: Apr. 19, 1973

[21] Appl. No.: 352,644

[30] Foreign Application Priority Data
May 3, 1972  Japan.................................. 47-43852

[52] U.S. Cl............................. 260/535 P; 195/28 R
[51] Int. Cl............................................. C07c 59/16
[58] Field of Search................ 195/28 R, 36, 37, 47; 260/527, 535

[56] References Cited
UNITED STATES PATENTS
3,086,928  4/1963  Schulz.................................. 260/535
3,689,359  9/1972  Fukuda et al...................... 195/28 R Primary Examiner—A. Louis Monacell
Assistant Examiner—R. B. Penland
Attorney, Agent, or Firm—Wenderoth, Lind & Ponack

[57] ABSTRACT

Sodium citrate dihydrate is recovered directly from a citric acid fermentation broth by removing impurities at pH 9 to 13 and concentrating the resulting fluid at pH 10 to 13. The sodium citrate dihydrate is used as food additives, detergent builders as well as desulfurizing agents.

2 Claims, No Drawings

METHOD FOR PRODUCING SODIUM CITRATE DIHYDRATE

This invention relates to a method for producing sodium citrate dihydrate directly from a citric acid fermentation broth.

Having been used in combination with citric acid in food industries, sodium citrate dihydrate has recently been used as a detergent builder and a desulfurizing agent as well, with its use being constantly enlarged in various applications. Accordingly, this compound has a very promising future.

However, there remains yet to be developed a method by which sodium citrate dihydrate could be produced directly from citric acid fermentation broths. Known methods for production of sodim citrate dihydrate inevitably require plural steps in their processes. That is to say, one method comprises the time-consuming procedure of removing the insolubles, most of which are the microbial cells, from the fermentation broth, adding an inorganic calcium salt, e.g. slaked lime, quick lime or calcium carbonate, to the residual fluid, harvesting the citric acid in the form of calcium salt, decomposing the calcium salt with sulfuric acid, removing the resultant calcium sulfate by filtration to obtain a crude solution of citric acid, adding a necessary amount of sodium hydroxide, sodium carbonate or sodium hydrogen carbonate to the solution to adjust it to pH 5.70 to 6.20, concentrating the solution at 47° to 65°C to cause sodium citrate dihydrate to crystallize, harvesting the crystals and drying the same to obtain the desired sodium citrate dihydrate.

Another known method comprises the steps of adding an aqueous solution of sodium carbonate to the calcium citrate slurry obtained from a citric acid fermentation broth in the same manner as above, removing the calcium carbonate by filtration to obtain an aqueous solution of sodium citrate, adjusting it to pH 5.70 to 6.20, concentrating the solution at 45° to 65°C, harvesting the resulting crystals and drying the same to obtain the desired sodium citrate dihydrate.

However, each of these conventional processes involves a complicated sequence of procedures and there are several procedural obstacles for obtaining the desired product of high quality. For example, the crystals of sodium citrate dihydrate obtained by these processes are sometimes colorized. Moreover, due to varieties of wastes produced in the sequence of the conventional processes, not only is the recovery of sodium citrate dihydrate low, but a great deal of expenditure is required for the disposal of wastes. Thus, these known methods have many disadvantages as far as commercial operations are concerned.

With the purpose of overcoming those disadvantages, the present inventors conducted an extensive study to develop a method by which sodium citrate dihydrate could be manufactured directly and inexpensively from citric acid fermentation broths.

The study led the present inventors to the surprising discovery that when the broth resulting from citric acid fermentation, obtained by growing a microorganism in a medium containing hydrocarbons as principal carbon sources, is subjected to a series of purification procedures at a strongly alkaline environment adjusted to pH 9 to 13 inclusive, the insolubles are discarded, and when this fluid is concentrated at pH 10 to 13 inclusive, the removal of the insolubles is very effective and thorough, and the resultant fluid is completely transparent and the sodium citrate dihydrate can be obtained as colorless crystals in a short time.

Thus, the object of this invention is to provide a method for producing sodium citrate dihydrate directly from citric acid fermentation broth.

Table 1 shows the difference between a prior art process and the process according to this invention.

Table 1

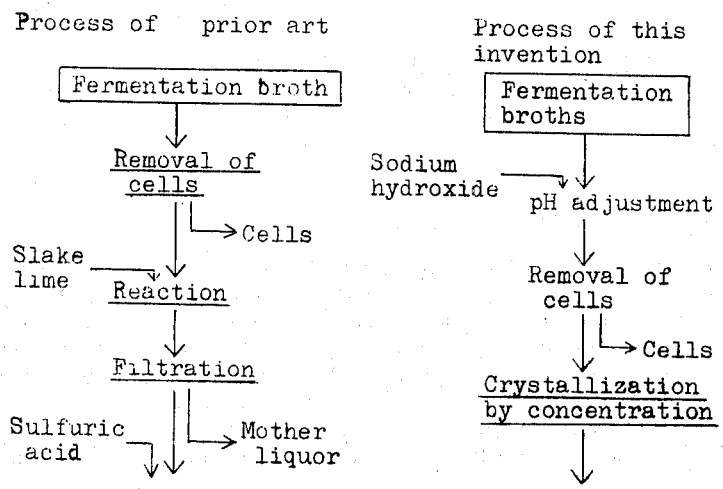

Table I—Continued

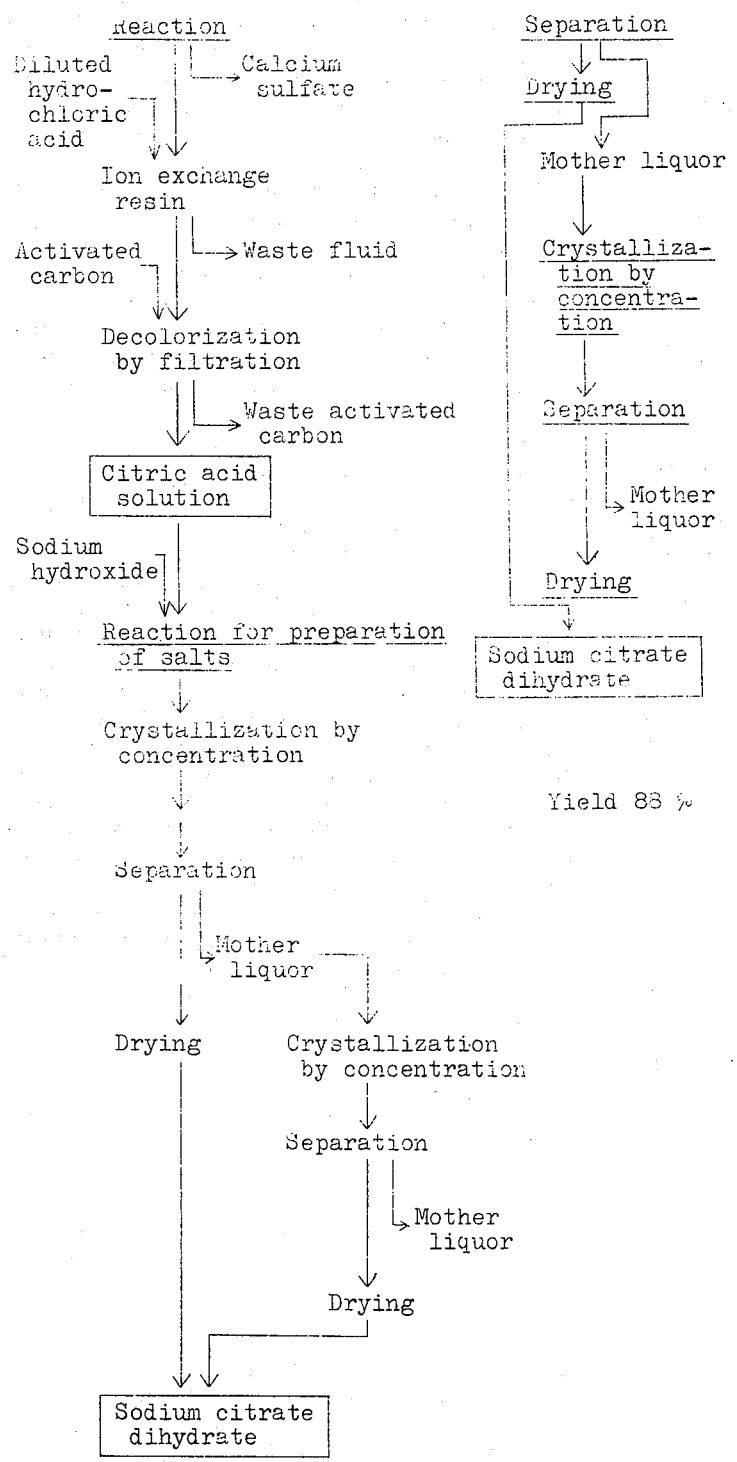

Yield 81 %

Yield 88 %

The advantages of the present method include:
1. Sodium citrate dihydrate directly crystalizes from a fermentation broth and, therefore, the process is considerably simplified;
2. Since the process of purification is conducted on the alkaline side (pH 9 to 13), sodium citrate dihydrate of improved quality is obtained.
3. The mother liquor from which the sodium citrate dihydrate has been recovered contains impurities in a high concentration, which makes it easy to dispose of them at low cost by, for example, removing the aqueous portion by evaporation followed by combustion.
4. The cells, after drying, can be utilized as a fertilizer.

In the method of this invention, use is made of a citric acid fermentation broth which is obtainable by growing a microorganism in a medium containing hydrocarbons as principal carbon source (cf. French Pat. Nos. 1,571,551 and 7,003,025). As the microorganism there is exemplified a yeast of the genera Candida, Brettanomyces, Debaryomyces, Hansenula, Kloeckera, Torulopsis, Pichia, Trichosporon, Saccharomyces, etc. and a bacterium of the genera Corynebacterium, Arthrobacter, etc.

If carbon sources other than hydrocarbons are employed, the resultant culture broth will be so heavily contaminated with coloring matters that the desired crystals can hardly be isolated by the method of this invention. In the medium there may be also incorporated nitrogen sources which will be digested by the microorganism employed, inorganic salts, amino acids, vitamins, and other nutrients of growth-promoting factors.

In conducting the cultivation, the pH of the medium is maintained at about 2 to 10 and, preferably, at about 3 to 8, this being effected by the addition of, for example, sodium hydroxide, sodium carbonate, sodium hydrogen carbonate or ammonia (e.g. ammonia water).

When ammonia is employed, however, citric acid in the broth forms its ammonium salt, with the result that in some stage or other of the purification procedure the ammonium must be removed by evaporation after converting the ammonium citrate into a sodium citrate by the addition of, for example, sodium hydroxide, sodium carbonate or sodium hydrogen carbonate.

Thus, as the pH regulator, sodium hydroxide, sodium carbonate or sodium hydrogen carbonate is most desirable for the preparation of citric acid fermentation broths to which the present purifying process is applied. Addition of calcium to the medium must be by all means avoided.

At the end of fermentation, pH of the broth is generally below 9 and, in the broth citric acid dissolves in a free form or as a salt with sodium or ammonium.

In these manners, a starting material employable for the present process is prepared. The impurities in the broth cannot be removed completely from the broth when the latter is treated without preadjustment of pH between 9 and 13 and the impurities will travel into the objective product, resulting in lowering its quality. It is therefore necessary that prior to the removal of insolubles, the broth be brought to pH 9–13 and that this pH adjustment be effected by means of sodium hydroxide, sodium carbonate or sodium hydrogen carbonate (These salts will hereafter be collectively called a water-soluble inorganic sodium salt). Thus, when the fermentation broth is adjusted to pH 9–13 with a water-soluble inorganic sodium salt and, then, subjected to a separation process, e.g. centrifugation, there is obtained a clear supernatant from which sodium citrate dihydrate can be caused to crystallize by concentration.

The relation of the pH of the fermentation broth and the clarity of the supernatant after the separation of insolubles is shown in Experiment 1.

EXPERIMENT 1

Aliquots of a citric acid fermentation broth (100 mg. citric acid/ml: pH 3.5) are adjusted to pH 6, 8, 9 and 12, respectively, and, then, centrifuged (6000 G., 5 min.). The supernatants are measured for clarity.

| Separation pH | pH3.5 | pH6 | pH8 | pH9 | pH12 |
|---|---|---|---|---|---|
| Clarity of supernatant | Highly turbid | Highly turbid | Turbid | Clear | Clear |
| Absorbance of supernatant at 650 mµ | 1.5 | 1.7 | 0.6 | 0.1 | 0.1 |

Then, the supernatant is concentrated at a temperature not lower than 50°C to cause crystals to separate. At a temperature lower than 50°C, sodium citrate pentahydrate separates out.

On the other hand, it is not so efficacious to cause crystals to separate at an excessively high temperature, because the solubility and the growth rate of sodium citrate dihydrate are only slightly dependent on temperature.

Generally speaking, therefore, it is desirable to cause crystals to form at 50° to 65°C. In conducting this concentration, the pH of the solution is maintained at 10 to 13. If the pH drops below the lower limit, it is necessary to bring back the pH into the above range with a water-soluble inorganic sodium salt. As mentioned before, it has heretofore been considered desirable to carry out the crystallization of sodium citrate dihydrate at a pH of 5.7 to 6.2, but if the solution is concentrated within such a pH range, the resulting slurry will be so extensively colored that fine and yellowish brown crystals will be obtained. To obtain a commercially acceptable product, it is necessary to dissolve the crystals, decolorize the solution and, then, recrystallize it. Moreover, since the coloring matters are not readily adsorbed on decolorizing carbon, a large amount of activated carbon is required to effect decolorization. We made a detailed study on the prevention of coloration and the infiltration of coloring matters into crystals and discovered that if a sodium citrate slurry from a fermentation broth is concentrated to crystallize at a strongly alkaline pH, namely at pH 10 to 13 and, preferably, pH 11 to 13, not only the coloration of the slurry is successfully prevented but the infiltration of coloring matters into crystals is totally suppressed to give transparent colorless crystals. It was also found that compared with the conventional crystallization process which is conducted on a weakly acid side, the growth of crystals is 1.5 times as rapid with the result that the required crystallization may be completed in considerably reduced time. It should be noticed that at any pH value over 13, sodium ion in excess of the stoichiometric equivalent of citric acid transfers into crystals so that the pH of the crystals inclines toward the alkaline side beyond a certain commercially allowable limit.

The following experimental data (Experiments 2 and 3) are given to illustrate the influence of crystallization pH on the quality and yield of sodium citrate dihydrate crystals.

EXPERIMENT 2

Aliquots (2l. each) of a citric acid fermentation broth (containing 110 mg. citric acid, pH 3.5) were adjusted to pH 6, 8, 10, 12 and 13, respectively, with sodium hydroxide, and after the insolubles are discarded, the pH of each supernatant was readjusted to the said pH, respectively.

Then, at 55°C, sodium citrate dihydrate was allowed to separate out by concentration and when the concentration of crystals in the slurry had reached about 80 % (W/V), the slurry was suction-filtered with a 100-mesh filter, washed with a small quantity of water and finally dried in the air. The qualities (coloration (E 400), Fe content, purity and pH) and yields of crystals are shown in Table 3.

The highest manageable concentration of crystals in the slurry is 75 to 80 % (weight of crystals (g)/volume(ml) of crystallization system × 100).

The crystal yield in this slurry is 70 to 75 % and, therefore, it is necessary to further concentrate the mother liquor to recover an additional amount of sodium citrate dihydrate (second crystallization).

The second crops of crystals are preferably obtained by operating under the condition described above for the recovery of the first crop of crystals. The overall yield of the crystals is as high as 90 to 93 % by these two stages of these crystallization.

Table 3

Effect of pH on qualities and yield of sodium citrate dihydrate.

| | | 6.0 | 8.0 | 10.0 | 11.0 | 12.0 | 13.0 |
|---|---|---|---|---|---|---|---|
| Separation and crystallization pH | | | | | | | |
| Depth of color of concentrate (E 400)* | | 2.65 | 2.25 | 1.15 | 1.05 | 1.05 | 1.00 |
| Qualities of crystals | Purity (%) | 98.5 | 98.7 | 99.0 | 99.3 | 99.2 | 98.7 |
| | Depth of color(E 400)** | 0.22 | 0.15 | 0.08 | 0.03 | 0.02 | 0.02 |
| | Fe (ppm) | 60 | 65 | 30 | 6 | 5 | 5 |
| | pH and the evaluation on the basis of FCC standard (Food Chemical Codex, U.S.A.) | 7.9 | 8.8 | 9.2 | 9.3 | 9.4 | 9.8 |
| | | proper | proper | proper | proper | proper | proper |
| | Yield (g) | 226 | 230 | 231 | 230 | 231 | 229 |
| Growth rate constant of crystals. $Ko(kg/m^2/hr)$ at 57°C | | 4.5 | — | — | — | 6.8 | — |
| Appearance | | Light yellowish brown | Light yellowish brown | Light yellowish brown | Colorless | Colorless | Colorless |

*Absorbance at 400 m$\mu$ of wave length.
**1g. of the crystals is dissolved in water to make up its 20 ml solution.

EXPERIMENT 3

Aliquots (2l. each) of a citric acid fermentation broth (containing 110 mg. citric acid, pH 3.5) were adjusted to pH 9.0 with sodium hydroxide, and after the insolubles are discarded, the pH of each supernatant was re-adjusted, to 6.0, 8.0, 9.0, 11.0, 13.0 and 13.5, respectively. Then, at 55°C, sodium citrate dihydrate was allowed to separate out by concentration and when the concentration of crystals in the slurry had reached about 80 % the slurry was suctionfiltered with a 100 mesh filter, washed with a small quantity of water and finally dried in the air.

The qualities (Coloration (E 400), Fe content, purity and pH) and yields of crystals are shown in Table 4.

The first and second crops of sodium citrate dihydrate thus obtained are harvested with a 100–150 mesh sieve filter, washed with a suitable amount of water and dried. The procedure yields colorless, clear crystals. If the mother liquor obtained in the above second crystallization step is further concentrated, a small amount of crystals will separate out. However, since these crystals are a mixture of sodium citrate dihydrate and sodium sulfate which is an impurity, it is not recommended to harvest a third crop. The following pages explain the preparation of the starting fermentation broths and the Table 4

Effect of pH on qualities and yield of sodium citrate dihydrate.

| | Separation pH | | | 9.0 | | | |
|---|---|---|---|---|---|---|---|
| | Crystallization pH | 6.0 | 8.0 | 9.0 | 11.0 | 13.0 | 13.5 |
| | Depth of color of concentrate (E 400)* | 2.20 | 1.98 | 1.20 | 1.10 | 1.10 | 1.05 |
| Qualities of crystals | Purity (%) | 98.8 | 99.0 | 99.0 | 99.0 | 98.9 | 98.6 |
| | Depth of color (E 400) | 0.18 | 0.13 | 0.09 | 0.04 | 0.03 | 0.03 |
| | Fe (ppm) | 45 | 45 | 35 | 10 | 7 | 8 |
| | Evaluation of pH on the basis of FCC standard | proper | proper | proper | proper | proper | improper |
| | Yield (g) | 228 | 230 | 230 | 231 | 232 | 230 |
| | Appearance | Light yellowish brown | Light yellowish brown | Light yellowish brown | Colorless | Colorless | Colorless |

Since the specific gravity of sodium citrate dihydrate is 1.81, the crystallization of the compound can be continued until the concentration of crystals in the slurry becomes considerably high.

examples are illustrative of the process of the present invention in more details. In these examples, relationship between part(s) by weight and part(s) by volume corresponds to that between gram(s) and millilitre(s).

Preparation of the Citric Acid fermentation broth

Preparation 1

*Candida lipolytica* IFO–1463 (ATCC-20237) is cultivated in the following medium at 28°C for 72 hours, while the pH of the medium is maintained at 3.5 by the addition of ammonia water, whereby a fermentation broth containing 104 mg. citric acid/ml is obtained. Medium composition (W/V): 7.0 % of n-paraffin (including n-paraffines of $C_{12}$ to $C_{14}$), 0.025 % of $KH_2PO_4$, 0.4 % of $(NH_4)_2SO_4$, 0.03 % of $CaCO_3$, 0.05 % of $MgSO_4$, 0.1 γ/ml of vitamin $B_1$, 0.015 % of anti-foaming agent, 0.1 % of KCl, 0.01 % of NaCl, 0.1 γ/ml of $CuSO_4$ and 10 γ/ml of $FeSO_4$.

Preparation 2

*Candida lipolytica* IFO–1463(ATCC-20237) is cultivated in the same medium as that used in Preparation 1 at 28°C for 72 hours while the pH of the medium is regulated at 6.5 with sodium carbonate, whereby a fermentation broth containing 95 mg/ml of citric acid is obtained.

Preparation 3

*Candida sp.* IFO–1464 is cultivated in the following medium at 28°C for 72 hours while the pH of the medium is controlled at 3.5 with sodium hydroxide, whereby a fermentation broth containing 101 mg/ml of citric acid is obtained. Medium ingredients (W/V): 7 % of n-hexadecane, 0.025 % of $KH_2PO_4$, 0.6 % of $(NH_4)_2SO_4$, 0.03 % of $CaCO_3$, 0.05 % of $MgSO_4$, 0.1 γ/ml of vitamin $B_2$, 0.1 γ/ml of $CuSO_4$, 10 γ/ml of $FeSO_4$ and 0.25 γ/ml of $ZnSO_4$.

EXAMPLE 1

To 10,000 parts by volume of the fermentation broth obtained by Preparation 1 is added sodium hydroxide to adjust the broth to pH 10 and the cells are separated by centrifugal sedimentation. The procedure yields 9,700 parts by volume of a clear supernatant. To this supernatant is added 50 parts by weight of sodium hydroxide and the mixture is concentrated under reduced pressure at 55°C. When the concentration of sodium citrate dihydrate has reached the saturation point, 15 parts by weight of seed crystals of sodium citrate dihydrate are added. Under stirring, the system is concentrated over about 3 hours to a crystal concentration of 75 % (W/V) in the slurry.

The crystals are harvested with a 150 mesh filter, washed with 1,100 parts by volume of water and dried.

The procedure yields 1,060 parts by weight of colorless crystals satisfying the FCC (Food Chemical Codex 1960, U.S.A.) standards. The volume of the mother liquor is 1,000 parts, whose pH is 12.0.

The washings are pooled with the mother liquor and the combined solution is concentrated under reduced pressure at 55°C. When the saturation point has been reached, 5 parts by weight of seed crystals of sodium citrate dihydrate are added. Under stirring, the system is concentrated over about 3 hours to a crystal concentration of 70 % in the slurry and the crystals are harvested with a 150-mesh filter, washed with 800 parts by volume of water and dried. The procedure yields 378 parts by weight of colorless crystals satisfying the FCC standards. The total amount (1418 parts by weight) of the first and second crops of crystals, exclusive of the seed crystals, is equivalent to a theoretical yield of 89.1 % based on the amount of citric acid contained in the fermentation broth. The pH of the mother liquor is 12.3.

EXAMPLE 2

A 5,000 parts by volume portion of the fermentation broth obtained by Preparation 2 is adjusted to pH 12.8 with 15 parts by weight of sodium hydroxide and the cells are removed by centrifugal sedimentation leaving 4,800 parts by volume of a clear supernatant. This supernatant is concentrated to 2,000 parts by volume under reduced pressure at 60°C. The pH of the concentrate is 11.3. The solution is further concentrated and, at the saturation point of sodium citrate dihydrate 8 parts by weight of seed crystals of sodium citrate dihydrate is added. Under stirring, the system is concentrated over about 2 hours to a crystal concentration of 72 % in the slurry and the crystals are harvested with a 150-mesh filter, washed with 450 parts by volume of water and dried. The procedure yields 455 parts by weight of colorless crystals satisfying the FCC standards. The volume of the mother liquor is 500 parts whose pH is 11.5.

The washings are pooled with the mother liquor and the combined solution is concentrated under reduced pressure at 55°C. When the concentration of sodium citrate dihydrate has reached the saturation point, 2 parts by weight of seed crystals of sodium citrate dihydrate is added. Under stirring, the system is concentrated over about 3 hours to a crystal concentration of 75 % in the slurry and the crystals are harvested with a 150-mesh filter, washed with 300 parts by volume of water and dried. The procedure yields 190 parts by weight of colorless crystals satisfying the FCC standards. The total amount of crystals exclusive of the seed crystals is equivalent to a theoretical yield of 87.4 % based on the amount of citric acid contained in the fermentation broth.

EXAMPLE 3

A 10,000 parts by volume portion of the broth obtained by Preparation 3 is adjusted to pH 13 by the addition of sodium hydroxide and the cells are removed by centrifugal sedimentation, whereupon 9,700 parts by volume of a clear supernatant is obtained. This supernatant is concentrated under reduced pressure at 55°C to 5,000 parts by volume, the pH of the concentrate being 11.5. It is further concentrated to saturation, at which point 15 parts by weight of seed crystals of sodium citrate dihydrate are added. Under stirring, the system is concentrated over about 2 hours to a crystal concentration of 72 % in the slurry and the crystals are harvested with a 150-mesh filter, washed with 1,000 parts by volume of water and dried. The qualities of thus obtained crystals satisfy the FCC standards. The volume of the mother liquor is 1,100 parts by volume, its pH being 11.9. The mother liquor is pooled with the washings and the combined solution is concentrated under reduced pressure at 55°C.

At saturation, 5 parts by weight of seed crystals of sodium citrate dihydrate is added. Under stirring, the system is concentrated over about 3 hours to a crystal concentration of 74 % in the slurry and the crystals are harvested with a 150-mesh filter, washed with 700 parts by volume of water and dried. The procedure yields 410 parts by weight of colorless crystals, satisfying the FCC standards. The total amount 1,380 parts by weight of crystals, exclusive of seed crystals, is equivalent to 88.4 % of a theoretical yield based on the amount of citric acid contained in the fermentation broth.

What is claimed is:

1. A method for producing sodium citrate dihydrate which comprises (1) adjusting a citric acid fermentation broth obtained by using a hydrocarbon as the principal carbon source for the culture medium to a pH from 9 to 13 inclusive with sodium hydroxide, sodium carbonate or sodium hydrogen carbonate, (2) removing the insolubles from the resultant broth, (3) concentrating the resultant fluid while maintaining the fluid at a pH from 10 to 13 inclusive with sodium hydroxide, sodium carbonate or sodium hydrogen carbonate, and at a temperature of 50° to 65°C to precipitate sodium citrate dihydrate crystals and (4) recovering the thus formed crystals from the fluid.

2. The method according to claim 1, wherein the citric acid fermentation broth contains citric acid in the form of its free acid, sodium citrate, ammonium citrate or ions thereof.

* * * * *